Aug. 12, 1969   W. C. SCHUMACHER ET AL   3,461,417
REINFORCED CAPS AND CONNECTORS
Filed July 27, 1967   2 Sheets-Sheet 1

INVENTORS.
WALTER C. SCHUMACHER,
LUTHER M. SHELDON
BY Paul E. Rochford
ATTORNEY

Aug. 12, 1969  W. C. SCHUMACHER ET AL  3,461,417
REINFORCED CAPS AND CONNECTORS
Filed July 27, 1967  2 Sheets-Sheet 2

INVENTORS.
WALTER C. SCHUMACHER,
LUTHER M. SHELDON

BY Paul E. Rockford

ATTORNEY

United States Patent Office 3,461,417
Patented Aug. 12, 1969

3,461,417
REINFORCED CAPS AND CONNECTORS
Walter C. Schumacher, Warwick, and Luther M. Sheldon, Cranston, R.I., assignors to General Electric Company, a corporation of New York
Filed July 27, 1967, Ser. No. 656,536
Int. Cl. H01r 3/06, 13/58
U.S. Cl. 339—14                                7 Claims

ABSTRACT OF THE DISCLOSURE

In heavier duty caps and connectors structural reinforcement is provided of the insulating housing by means of metal screws which are threaded to a clamp assembly to distribute the strain which would otherwise be placed on the conductors. The present invention provides a strong mechanical interlocking of the clamp elements through the device with a minimum of metal parts and utilizes specifically columns of insulating material formed integrally with the plastic housing of the device to insulate metal screws and to distribute stress from the cable sheathing through the plastic column through the device. The compressive force generated between the through-screws and an annular ring holding the cable clamp is also utilized to ensure good grounding contact of the clamp and screws with a grounding electrode.

This invention relates to electrical wiring devices of the character of an electrode mount and conductor fitting wherein electrodes having among them a grounding electrode are supplemented and housed and are accessible to serve as components having companions in a separable electrical coupling and an exposed electrically conductive clamp device is interrelated with the electrodes for a sheathed electrical conductor to be clamped at the sheath in the clamp device and have wires electrically connected with the electrodes, and more particularly the invention is concerned with grounding arrangements for establishing electrical continuity between a grounding electrode and an electrically conductive clamp device in such an assembly.

An object of the present invention is to provide stronger cap and connector devices at lower cost.

Still another object of the invention as disclosed herein is the provision of a structural arrangement for the establishment and maintenance of electrical continuity between an electrically conductive clamp device and a grounding electrode of the wiring device.

Another object herein is to provide an electrode mount and conductor fitting in which the components are arranged in a highly satisfactory manner to produce, as an incident to being mechanically assembled, an electrical interconnection having therein an electrically conductive clamp device and a grounding electrode.

Another object herein is the provision of an electrode mount and conductor fitting wherein an electrically conductive clamp device and a grounding electrode are sustained electrically interconnected in slave to mechanical connector means in the electrical mount and conductor fitting by which the electrode mount and conductor fitting is held assembled.

Other objects of this invention in part will be obvious and in part pointed out more fully hereinafter.

As conducive to a clearer understanding of certain features of the present invention and as pointed out briefly above it may be noted at this point that in the instance of electrical plugs, electrical receptacles offering female counterpart for plugs, or in a host of other instances where an electrode mount and conductor fitting is to house and support electrodes to be accessible as components to have companions in a separable electrical coupling, it has become a practice to add an electrically conductive clamp device for clamping the sheath of a sheathed electrical conductor having wires to serve the electrodes, and to introduce among the electrodes a grounding electrode which is electrically interconnected with the clamp device for grounding purposes. Also as noted briefly above a clamping of a region of a sheathed electrical conductor by the clamp device further satisfies such objectives as to forestall having the sheathed conductor transmit through and past the clamped region a mechanical load which otherwise on being encountered by the sheathed conductor would impose stress upon electrical junctions made with wires of the conductor and the electrodes in the electrode mount and conductor fitting which are to be served by the wires.

More generally in accordance with the present invention an electrode mount and conductor fitting is provided having at least three electrodes each arranged to be electrically connected with a wire of sheathed electrical conductor and serve as a component to have a companion, such as the male or female opposite, as the case may be, in a separable electrical coupling. Among the electrodes in the electrode mount and conductor fitting is a grounding electrode which in the assembly is associated with electrical interconnector means in a manner to be explained. In addition to the electrodes and the electrical interconnector means the electrode mount and conductor fitting includes housing, clamp and mechanical connector means which is characterized by comprising an electrically conductive clamp device for clamping a sheathed electrical conductor at the sheath, housing means arranged with the electrically conductive clamp device, the electrodes and the electrical interconnector means, all aforementioned, for supporting and housing the electrical interconnector means between the electrically conductive clamp device and the grounding electrode for the electrodes, the housing means and the electrically conductive clamp device to be mechanically united and the electrically conductive clamp device, the grounding electrode and the electrical interconnector means all aforementioned coincidentially mechanically to be held in slave electrical interconnection. The arrangement further is that the housing means supports the electrically conductive clamp device and supports and houses the electrodes accessibly, for an electrical conductor to have a sheath clamped in the electrically conductive clamp device and wires electrically connected with the electrodes and the electrodes to be components for having companions in a separable electrical coupling. The housing, clamp and mechanical connector means further includes mechanical connector means for mechanically uniting the electrodes, the electrically conductive clamp device and the housing means, and coincidentally holding in slave the electrically conductive clamp device, the grounding electrode and the electrical interconnector means in electrical interconnection.

In the accompanying drawing representing an embodiment of the present invention and more particularly representing a form of electrode mount and conductor fitting involving in way of example of an electrical plug;

Figure 1:
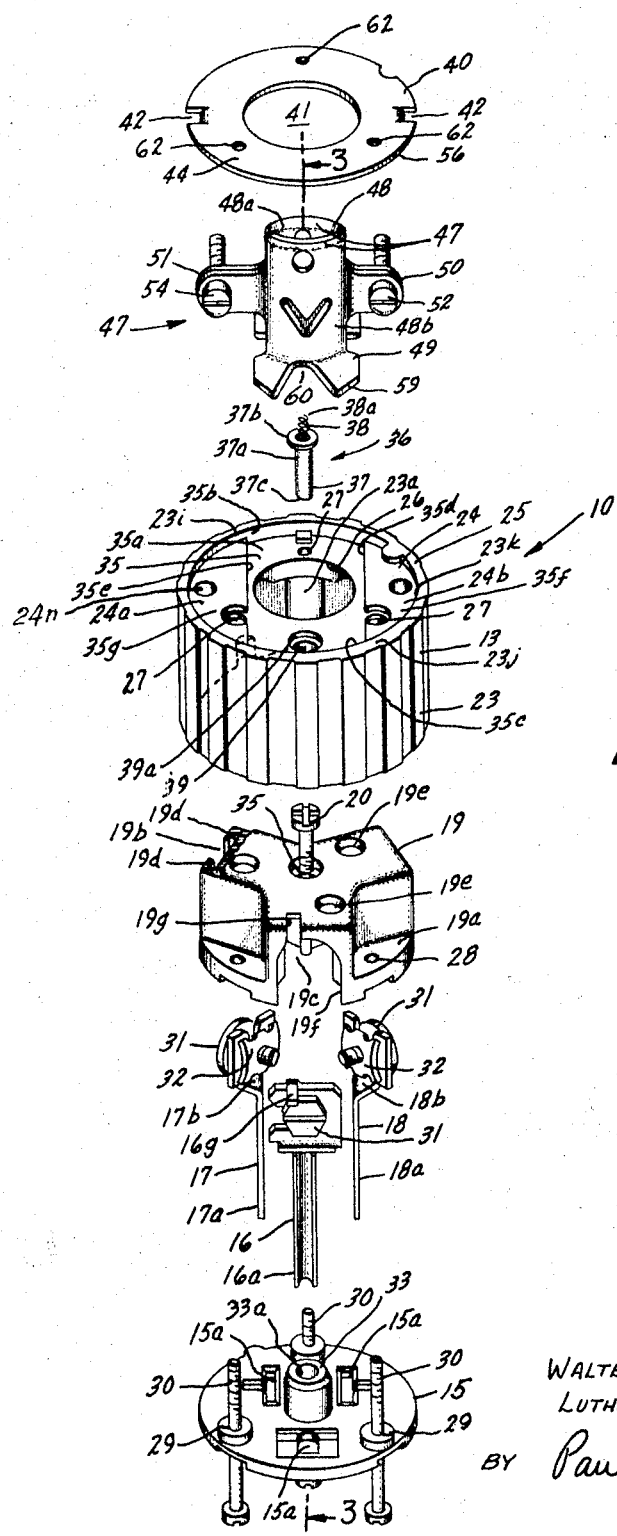
FIGURE 1 is an exploded view of the electrode mount and conductor fitting.
Figure 2:
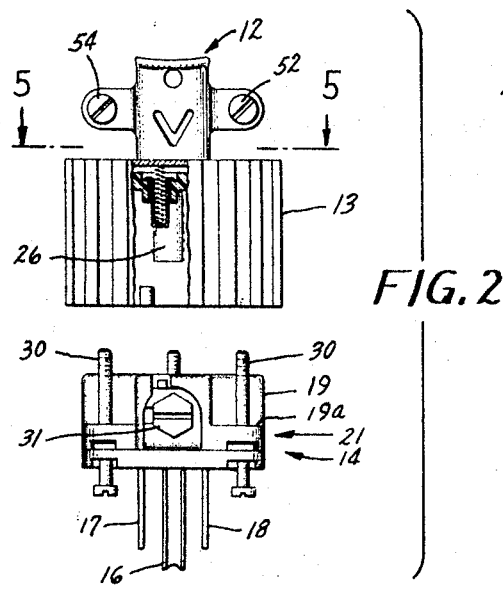
FIGURE 2 is a partial assembly view of the electrode mount and conductor fitting of FIGURE 1.

Referring now to the embodiment represented in the accompanying drawing, the electrode mount and conductor fitting designated generally by reference number 10 includes in combination a male connector or plug 11 (FIGURE 3) and an electrically conductive clamp device 12. The plug 11, having electrodes 16, 17 and 18 as mounted components, and being equipped with the clamp device 12, is suited to clamp and thus fit onto a sheathed electrical conductor 22 at the sheath along the length of the conductor in advance of ends 22b of the conductor wires which are accommodated electrically connected with electrodes 16, 17 and 18 within the housing of the plug and are spared strain from axial load which the conductor 22 may encounter outside the clamp device 12. One of the plug electrodes, namely the electrode 16, as housed and connected in the electrode mount and conductor fitting 10, is available as a grounding electrode electrically interconnected with the electrically conductive clamp device 12.

More particularly, plug 11 includes casing means in the form of a cap 13 of electrical insulating material, the cap being a portion of the plug housing, and further the plug has electrode holder means 14 comprising casing closure means shown in the present embodiment as being in the form of an electrode retaining plate 15 of annular form and of electrical insulating material, the casing closure means thus further being a portion of the plug housing and serving to close the casing means or cap and retain and support the plug electrodes 16, 17 and 18 with the aid of cover means which comprises the electrode cover and support block 19 also of electrical insulating material. The electrode retaining plate 15 and the electrode cover and support block 19 are adapted to be mechanically interengaged, the electrode holder means 14 suitably having a screw 20 arranged with the electrode retaining plate 15 and with the electrode cover and support block 19 to secure these means together to house and support the electrodes 16, 17 and 18 and for the resulting assembly to be an electrode unit 21.

The electrode mount and conductor fitting 10 is further characterized by the fact that the electrically conductive clamp device 12, together with cap 13 and the electrode unit 21 are arranged to be mechanically interconnected to achieve assembly and through this to accomplish and maintain a bridge involving the electrically conductive clamp device 12 and the electrode 16 electrically interconnectedly for use in grounding the clamp device as a safety measure.

Cap 13 has an externally cylindrical side wall 23 integral with a transverse end wall 24 which is disposed marginally inwardly from the end face 25 (see FIGURE 1) of side wall 23. End wall 24 is provided with a substantially central opening 26 and thus defines passage means in the plug housing for receiving ends 22b of the wires of the sheathed conductor 22 for connection with the electrodes 16, 17 and 18. Wall 23, at the face inside the cap 13, is generally cylindrical intermittently of laterally spaced integral studs 23a, one of which is visible in FIGURE 1, and which extend longitudinally into adjointment with end wall 24. At the end opposite from wall 24 the cap 13 is open annularly having side wall 23 marginally projecting somewhat beyond adjacent ends 23c of the studs of the wall 23 so that the electrode cover and support block 19 at flanges 19a of the block core abut the ends 23c of the studs for support while in turn supporting the electrode retaining plate 15 for the latter to close the corresponding open end of the cap 13. Longitudinal passages 27 in the studs 23a are extended through the integral end wall 24 of the cap and have alignment and communication with openings 28 in the electrode cover and support block 19 and with opening 29 in the electrode retaining plate 15 to receive screws 30 through the latter two members and through the cap 13 to assemble the plug 11.

Socketed portions 19b of the electrode cover and support block 19 are integral with the flanges 19a (see FIGURES 1 and 3) and which flanges occur at intervals between the socketed portions annularly. Sockets 19c accordingly formed are entrant from the lower face of block 19 as viewed in FIGURE 1, there being opposed guideways or grooves 19d in each of the sockets 19c for a terminal end of one of the electrodes 16, 17 and 18 endwise to be inserted at the side edges in the guideways of the related socket and be guided into the socket and thereafter contained in the guideways and socket. Peripherally of the electrode cover and support block 19 the socketed portions 19b are open at 19f between the guideways of the related sockets 19c, thus exposing operably to view externally of the block the heads of terminal screws 31. The shanks of screws 31 are through apertures in the terminal ends of the electrodes 16, 17 and 18 in the sockets and threadedly engage clamping nuts 32 for connecting the wire ends 22b of the electrical conductor each to a corresponding one of the electrodes 16, 17 and 18. The wire ends 22b are first inserted through opening 26 in the end wall 24 of the cap and thereafter to enter the sockets 19c, through wall openings 19e in the bases of the sockets. The electrical connections between the conductor wire ends 22b and the terminal ends of the electrodes then are made by setting the related screws 31 and nuts 32 to engage the wire ends to the terminal ends of the electrodes. With the electrodes 16, 17 and 18 thus electrically connected and having their terminal ends in place in the sockets 19c, the blade portions 16a, 17a and 18a of the electrodes may also be associated with plate 15 for retention. The blade portions accordingly extend through corresponding slots 15a in the electrode retaining plate 15 for these blade portions accessibly to serve as components to have female companions in a separable electrical coupling. A central projection 33 of the electrode retaining plate 15 is received in a central cavity 34 in the electrode cover and support block 19 (see FIGURE 3) and has threads in an aperture 33a. Aperture 33a is aligned with a passage 35 axially through the electrode cover and support block 19 to receive the screw 20 through the electrode cover and support block for forming the threads in aperture 33a and interconnecting the electrode cover and support block and the electrode retaining plate. In the electrode unit 21 thus formed, jogged portions 17b and 18b of the electrodes 16, 17 and 18 rest upon the inside face of the electrode retaining plate 15 and the terminal ends of the electrodes are thus supported in place in the sockets 19c while having electrical connections with the wire ends 22b of the electrical conductor.

Cap 13 externally has a recess 35 (see FIGURE 1) which opens outwardly. Bottom face 35a of the recess is afforded by transverse end wall 26 of the cap and has a plane substantially perpendicular to the axis of opening 26. Bottom face 35a is interrupted medially between diametrically opposite portions 23i and 23j of side wall 23 by the opening 26, and thus laterally from this opening the bottom face 35a extends in opposite directions to the recess end faces 35b and 35c which are on the side wall portions 23i and 23j. Stepped portions 24a and 24b of end wall 24 join the side wall portions 23i and 23j and provide substantially parallel side faces 35d and 35e of the recess 35 adjacent to opposite sides of the opening 26. Leading into the recess 35, the cap 13 has an annular rim 23k represented by a marginal projection of side wall 23 outwardly from faces 35f and 35g of the stepped portions of the end wall 24. These faces 35f and 35g extend from the side faces 35d and 35e of the recess 35 and have a common plane substantially parallel to the plane of the bottom face 35a of the recess.

For the electrode 16 to be electrically interconnected with the electrically conductive clamp device 12 for purposes of grounding, the electrode mount and conductive fitting 10 also includes electrical interconnector means 36. Further, in the present embodiment the electrical interconnector means 36 is resilient and comprises an electrically conductive plunger 37 and an electrically conductive spring 38 which suitably is helically coiled and the plunger and spring are arranged and disposed to provide electrical interconnection resiliently between the clamp device 12 and the electrode 16. More particularly, a passageway 39 leads through end wall 24 of the cap 13 from the bottom face 35a of recess 35 to the inside of the cap 13 and the cap accommodates the plunger 37 slidably and guidedly in this passageway. Plunger 37 comprises a shell 37a of cupped shape, opening externally of the cap 13 and having a substantially closed bottom end 37c which projects into the hollow interior of the cap 13 sufficiently far for electrically connecting compressingly with the grounding electrode 16 initially against bias of the coil spring 38 and subsequently as the device is brought into its final stages of assembly by compression of the plunger 37 itself. For the latter purpose the electrode cover and support block 19 has an aperture 19g and the contact end of the plunger extends through this aperture and is electrically connected with the ground-electrode mount and conductor fitting 10. The end of ing electrode 16 in the assembled condition of the the plunger shell, opening externally of the cap 13 has an outwardly projecting flange 37b for seating outside the cap end wall 24, the passageway 39 being countersunk at 39a to a depth which is appreciably greater than the thickness of the flange 37b and thus the passageway 39 is enlarged externally and entrantly of the plug 11 from the bottom 35a of recess 35 for end wall 24 to accommodate and seat the plunger flange 37b for the plunger to be moved in assembling the electrode mount and conductor fitting 10. One end of the coil spring 38 is electrically connected with plunger 37 within the cup of the plunger shell and an opposite end 38a of the spring extends outside the cup of the plunger to be engaged with the clamp device 12 for the plunger to maintain a biased electrical connection with the clamp device even when the clamp is not fully closed.

The electrically conductive clamp device 12 has a base plate 40 wherein a centrally disposed opening 41 is provided and first and second substantially parallel opposed sides 44 and 56 of the base plate communicate through this opening. The base plate 40 and cable clamps to be described are made of electrically conductive material and are electrically conductively interconnected when securely on the base plate on opposite sides of the base plate opening 41.

The pair of electrically conductive clamp components 47 of the clamp device 10 have jaws 48 which are troughed throughout the longitudinal lengths of the clamp components and the jaws are integral with feet 49 of the clamp components adjacent to inner ends of the jaws. As more generally related to base plate 40, the jaws 48 longitudinally coextend laterally movably through the base plate opening 41 and beyond side 44 of the base plate while the feet 49 of the clamp components extend outwardly along the opposite side 56 of the base plate for being supported externally of the device, the feet thus to be maintained having a plane in common and be slidably in contact with side 56. Also, the jaws 48 in the present embodiment, have opposing transversely rounded smooth clamping surfaces 48a inside the troughs of the jaws opposed by transversely rounded outer surfaces 48b outside the troughs, each foot 49 being integral with the inner longitudinal end of the related jaw and extending outward radially from the transversely rounded outer surface 48b of the jaw to have a plane substantially normal to the longitudinal axis of the jaw.

Each of the cable clamps have pairs of ear side extensions 50 and 51 on either side to accommodate clamping screws 52 and 54. The clamp nearest the screw head has a hole through which the screw may slide and that most remote from the screw head is threaded to receive the screw thread. The jaws 48 can be laterally shifted on the screw shanks to engage an electrical conductor between the jaws before the screws are set finally for the jaws to effect the clamping action and be electrically connected to base 40.

The radius of the transverse curvature of jaws 48 at clamping faces 48a is preferably substantially equal to the radius of opening 41 in the base plate. Feet 49 of the clamp components are of a width substantially equal to the width of recess 35 in the cap 13 and are of a length sufficient for the outer edges 59 of the feet to be disposed behind plate 40 and radially outwardly of the opening 41 in the base plate when the components 47 are in their innermost and outermost relative lateral positions. Accordingly, when the clamp components are in the innermost position the feet 49 still effectively overlap the base plate 40.

Figure 5:
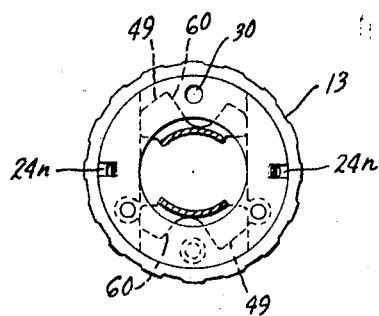
FIGURE 5 is a plan view partially in section and partially in phantom showing the relationship of the clamp device and housing as seen in a horizontal plane of line 5—5 in FIGURE 2.

Base plate 40 is substantially circular in configuration at the outer edge thereof and is of a diameter slightly less than the inside diameter of side wall 23 of the cap 13 for the base plate to be seated having side 56 against faces 24a and 24b of the stepped portions of the end wall 24 of cap 13 in a covering relationship to recess 35. The base plate 40, furthermore, is provided with integral portions in the form of bent tabs 42 which are located adjacent to the outer edges and extend from opposite sides of the base plate perimeter. The tabs 42 enter notches 24n which lead from surface 24 of the cap. The tabs are pressed into notches 24n of surface 24 thus to engage portions of end wall 24 on the inside of cap 13 and thereby securely interconnect the clamp device 12 with the cap. Recess 35 in the end wall 24 of cap 13 is of a width substantially equal to the width of feet 49 of clamp components 47 so as in this respect to have the recess sides 35d and 35e available to stabilize the feet, and is of a depth slightly less than the thickness of the feet. Thus, with the clamp device 12 interconnected with cap 13, feet 49 are disposed behind face 56 of base plate 40 and in recess 35 for sliding movement in the recess laterally of aperture 41 in the plate and laterally of passage 21 in the cap end wall. Further it will be seen that a pre-assembly including the clamp device 12, the cap 13 and the interconnector means 36 is had with the clamp device secured to the cap by tabs 42. The contact portion 37a of the electrical interconnector means 36 in this preassembly electrically conductively engages a contact portion of face 56 of the clamp device base plate 40 and helical spring 38 is held compressed to seat plunger flange 37b against the cap end wall 24 in aperture 39 and maintain electrical connection of contact portion 38a of the electrical interconnector means 36 with the clamp device base plate 40 compressively. A cleft 60 (see FIGURE 5) in foot 49 of one of the clamp components 47 is open toward the helical spring 38 laterally of the spring to provide a clearance of flange 37b during sliding movement of this same clamp component 47 when the clamp jaws are being opened and closed. A similar cleft 60 in foot 49 of the other of the clamp components opens toward a position which one of the screws 30 occupies in the assembled electrode mount and conductor fitting 10 for the cleft to accommodate the particular screw laterally of the screw with clearance when the clamp jaws 48 are being opened and closed.

Figure 4:
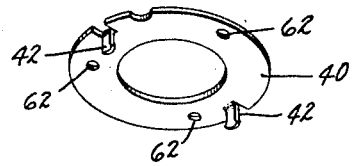
FIGURE 4 is a perspective view of the ring portion of the clamp device of FIGURE 1 as seen from another vantage point.

Prior to the clamping of electrical conductor 22 in the jaws 48, the clamp components 47 are brought to an open position which is accomplished by retracting the screws 52 and 54 and then sliding the feet 49 by manually moving the jaws laterally. The conductor 22 then is inserted between the jaws 48 and through opening 41 in the base plate 40 and through opening 26 in end wall 24 of the cap 13. The wire ends 22b of the electrical conductor thereafter are electrically connected with the terminals of the plug electrodes 16, 17 and 18 through first inserting these wire ends through the openings 19e of the electrode cover and support block 19 and the electrodes 16, 17 and 18 through slots 15a in the electrode retaining plate 15 and then making the electrical connections. With the electrode terminals disposed in sockets 19c of the electrode cover and support block 19 the electrode retaining plate 15 is fastened in place by screw 20 and the resulting electrode unit 21 as a pre-assembly is brought into position wherein flanges 19a of the electrode cover and support block 19 abut against the ends 23c (see FIGURE 3) of studs 23a of the cap 12, the electrode unit 21 thus closing the open end of the latter member. Screws 30 (see FIGURES 1 and 3) are inserted through apertures 29 in the electrode retaining plate 15, thence through the apertures 28 in electrode cover and support block 19 and through passages 27 in the studs 23a, thereafter to have threaded ends project into apertures 62 (FIGURE 4) in the base plate 40 and engage threads provided in the base plate in the latter apertures. The screws are accordingly tightened to draw the cap 13 and the electrode unit 21 into firm mechanical interconnection and to secure the clamp device 12 in the electrode mount and conductor fitting 10, the clamp feet 49 meanwhile being disposed in recess 35 of cap end wall 24 and held to be moved slidably in the manner hereinbefore described. The mechanically connective portions of the cap 13 and of the electrode holder means 14, and more particularly those portions wherein the longitudinal passages 27 and the openings 28 and 29 are located to receive the screws 30, enable these screws to mechanically interconnect the cap 13 and the electrode unit 21 and thus the electrodes 16, 17 and 18 with the clamp device 12 and thereby have the electrical interconnector means 36 interposed between the grounding electrode 16 and the clamp device base plate 40 with the screws 30 holding the plunger contact end 37c compressively electrically connected with the grounding electrode 16 while the opposing contact portion 37b of the electrical interconnector means 36 is held compressively electrically connected with the electrically conductive clamp base 40 at face 56 of this base and the electrical interconnector means accordingly electrically interconnects the clamp device 12 and the grounding electrode 16.

A feature of the present invention is the provision of a unique grounding assurance even where the screws 30 are not fully tightened. It is evident that as the screws 30 are tightened the pressure between a grounding tab 16g of grounding electrode 16 and the undersurface 56 of clamp base 40 will be increased. The increase is evidenced in part by any upward deflection of the section of clamp base 40 above the flange 37b and between the two screws 30 holding the clamp base 40 at the proximate threaded holes 62. Strong grounding contact is assured by employing the flexure properties of the clamp base itself for this purpose.

In addition however should the screws 30 of the device not be tightened sufficiently to utilize the flexure properties of the clamp base 40, the grounding of the clamp structure 47 and clamp base 40 is assured by the pressure electrical contact extending through the spring 38 the grounding plunger 37 and the grounding tab 16g of grounding electrode 16.

Accordingly in tightening the screws 30 to have the studs ends 23c of the cap 13 abut flanges 19a of the electrode cover and support means 19, and to have the electrode retaining plate 15 close the related end of the cap, plunger 37 is brought into contact with the grounding tab 16g of electrode 16 inasmuch as it is moved against the bias of spring 38. In this electrical contact through flange 37b as the grounding tab 16g contacts the bottom 37c of plunger 37, the plunger moves outwardly in aperture 39, and is held to float between the cap end wall 24 and foot 49 of one of the clamp components 47 in the assembled condition of the electrode mount and conductor fitting 10.

Figure 3:
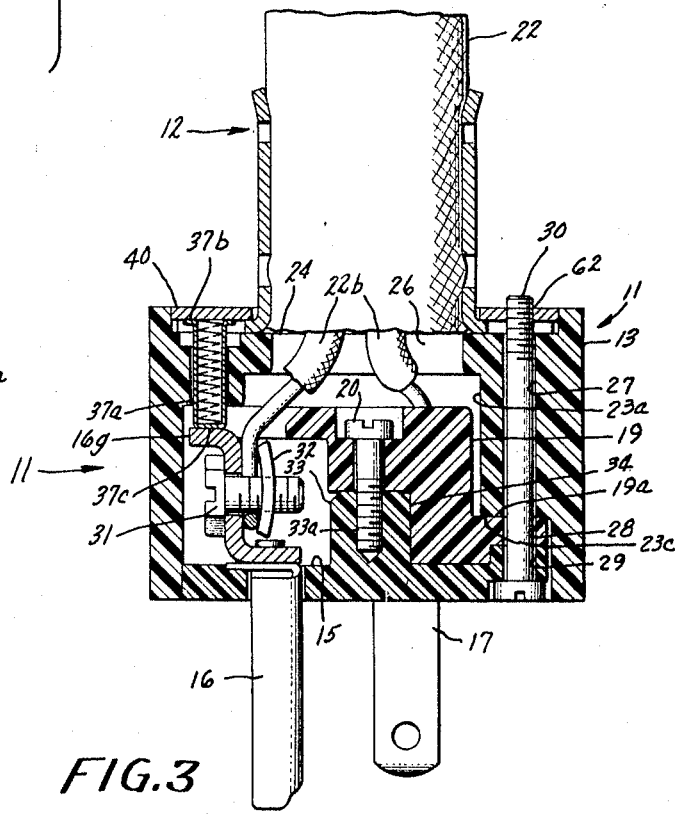
FIGURE 3 is a sectional elevation taken at line III—III in FIGURE 1 with the components of the electrode mount and conductor fitting fully assembled.

Further, it will be appreciated that the clamp components 47 are preferably held in pressure contact with clamp base 40 as shown in FIGURE 3. During the insertion of a conductor between the clamp components and during tightening of the components the screws 30 must be somewhat loosened so that proper spacing and alignment of feet 49 can take place. It is evident that the spring 38 can maintain grounding contact even when the screws 30 are loosened slightly to permit a lateral shifting or realignment of the cable relative to the device 11. When screws 30 are adequately tightened the frictional forces on the surfaces of feet 49 restrain lateral displacement of a conductor engaged between clamp components 47, regardless of whether the conductor is of small or large diameter. In this condition, when the clamp components are in clamping relationship on opposite sides of conductor 22, any lateral movement or adjustment of cable position will be with a grounding contact maintained with respect to base plate 40. This is because feet 49 contact the base plate side 56. The electrical interconnector means 36 is available electrically interconnecting the clamp device 12 and the grounding electrode 16 for the wire of conductor 22 connected with the terminal of the electrode 16 to be a ground wire and thus provide a factor of safety.

Although considerable emphasis has been placed herein upon the fact that the electrode mount and connector fitting is an electrical supply plug, it will be appreciated that the electrode mount and connector fitting may instead take the form of an electrical receptacle having female electrodes in an electrode holder means suitably modified for the purpose or may take any of a variety of other forms still in compatability with the spirit of the present invention.

As many possible embodiments of the present invention may be made and as many changes may be made in the embodiment hereinbefore set forth, it is to be distinctly understood that the matter described herein is to be interpreted as illustrative and not as a limitation.

From the foregoing it will be evident that there is provided in accordance with the present invention a structure having a number of distinct and valuable attributes. Some of these may be made somewhat clearer from the brief description which follows wherein certain of the features evident from use of the device will be pointed out.

In the first place it will be evident that there are essentially two sub-assemblies which are held together by the screws extending through the device generally parallel to the axis.

To wire the device the two sub-assemblies are first separated by loosening the screws so that the outer cover and clamp sub-assembly can be separated from the electrode mount sub-assembly to which the conductors of a cable will be attached. Accordingly, a cable clamp and outer cover sub-assembly is first threaded onto a cable so that the cable end first enters the clamp and then passes through the outer cover in a manner as if the cable end were a thread. The clamp and outer cover sub-assembly is accordingly pushed along the cable away from its end to give working access to the cable end itself so that portions of the outer cable sheath and of the individual conductors of the cable may be removed to expose a suitable length of the individual conductors.

Preparation of the cable end for wiring to the electrode mount sub-assembly is facilitated by the fact that the wiring is of the wire clamp type. That is, a straight length of the exposed wire is simply inserted into one of the holes 19e which are provided for the purpose and the corresponding screw 31 is tightened to bring its clamping nut 32 into clamping engagements with the conductor inserted therebetween. Accordingly, there is no necessity in wiring the device to diassemble the electrode mount sub-assembly 21 or to wrap wire ends around a binding screw.

After the wiring of the exposed conductors of the cable into the electrode mount sub-assembly, the outer cover and cable clamp sub-assembly is moved toward the cable end and into position over the cable mount sub-assembly. The screws 30 are then inserted into and tightened in the threaded openings in the base plate or annular ring 40. A strong compressive force can be exerted through the material proximate the screws because of the high tensile strength of steel screws which are threaded into the plate and because the plate itself is made of steel. Accordingly the screws are enclosed in an insulating sheath which constitutes a compression column which carries the compressive force generated by tightening of the screws. Note in this regard that the shelf diametrically opposite hole 39 of outer cover 10 on which the plate 40 rests constitutes part of such a compression column.

In part the strength or toughness of the device is due to the support given by the column of compressed material to parts of the device which are formed integrally with the column of compressed material surrounding the screws 30 and by the screws themselves which in this sense function as reinforcing elements. To function in this manner the material of the device must be yieldable or compressable having properties as in this case of polyvinyl chloride and must not be rigid or have the low yieldability of materials such as phenolic. In the device illustrated for example the holes 28 of the inner cover 19 of the electrode mount sub-assembly 21 are formed in a portion of the insulation structure which is supported by the compressive force generated between the upper surface of the electrode holder plate 15 and the lower surface of 23a. This relation of the parts for compression of the material proximate the screws and for the resultant reinforcing action of screws 30 is clear from FIGURE 3.

A smaller compressive force is generated also in the grounded versions of this device by the compressive force between a portion of the plate 40 and the upper end of a grounding electrode. In this specific illustration, the compression is carried by the plunger element 36 but it is evident that equivalent structures may be substituted including a structure integral with the terminal portion of the grounding electrode. The compressive force through the plunger is of a lower order than that through the column of material surrounding the screws 30 because the force exerted by the plate on the plunger is not at the portion of the plate 40 where a screw is threaded into the plate. Accordingly some deflection of the portion of the plate 40 contacted by the plunger can occur to result in a biased contact but one of lower compressive intensity than occurs directly adjacent the screws. Similarly, the pressure of the grounding plunger on the grounding electrode is not as high as that at portions of the sub-assembly proximate the reinforcing crews. In the form of the device as illustrated in the figures, the wiring may be accomplished without interference from any element projecting up from the terminal of the grounding electrode and the contact with the grounding electrode is made with a plunger depending from the outer cover after the wiring of the conductors of the cable to the electrode mount sub-assembly is completed. Much more positive electrical contact is aflorded of course where the contact is through a compressive force between two members rather than through a wiping contact as used in prior art devices.

It will be understood that the advantages recited above as pertaining to the device of the figures are equally applicable to a connector device in which the electrodes are entirely contained within the elecrode mount sub-assembly and the openings provided are for entry of electrodes from a separate cap.

Accordingly for either the cap or connector form of the device it will be apparent that a strong force applied to the cable insulation or cable sheathing will be distributed from the clamp to the face of the electrode mount sub-assembly and by a solid column of insulating material which surrounds the screws through the entire device. This distribution occurs first because the clamp feet are directly in contact with the inner surface of the metal ring. Secondly it occurs beause the screws are threaded to the metal ring and the screws transmit the force to the screw heads. Further, the compacted column of insulation which surrounds the screws is formed integrally with the internal insulating parts of the device and accordingly transmits the force to all parts attached to the column, including the outer walls of the device. Moreover due to this interconnection all exposed metal parts of the device are accordingly grounded including the faces of the screws exposed at the face of the electrode assembly.

What is claimed is:

1. A wiring device comprising
a generally cylindrical insulating housing and axially aligned attached metal clamp,
said housing being axially separable into an electrode mount sub-assembly and a cable clamp and outer cover sub-assembly,
said cable clamp and outer cover sub-assembly having a hollow center through which a cable can be threaded to be connected to the separated electrode mount sub-assembly,
said electrode mount sub-assembly including an insulating electrode holder and an insulating wire terminal inner cover and electrodes mounted therein,
said holder and inner cover being axially separable,
said electrodes having a wire terminal section and a power contact section, openings through said electrode holder to provide passages for power contact portions of electrodes, and wire entry and tool access openings through said electrode mount sub-assembly for wiring the conductors of a cable to said wire terminals while said electrode cover and inner cover are assembled,
and the outer cover of said cable clamp and outer cover sub-assembly being mountable over the inner cover and at least a portion of the electrode holder of said electrode mount,
said cable clamp comprising an annular metal ring mounted on the outer planar surface of said cover and a pair of footed clamp elements disposed in the hole of said ring with the feet in contact with the inner ring surface and extending radially outwardly therefrom,
and a plurality of screws extending from the external face of the electrode holder of said electrode mount sub-assembly to the outer face of said annular ring, and threadably engaging said ring to urge the sub-assemblies together and to frictionally engage the clamp feet between the inner surface of the ring and outer surface of the outer cover.

2. The wiring device of claim 1 wherein one of said electrodes is a grounding electrode and a conductor is compressively held between the wire terminal portion of said grounding electrode and the annular metal ring.

3. The wiring device of claim 1 wherein the power contact portions of said electrodes are contained within said electrode mount assembly and the openings in said electrode holder provide access openings for power receiving electrodes for contact with said power contact portions.

4. The wiring device of claim 1 wherein an insulating separation is maintained between the interior of the device and the screw members extending therethrough.

5. The wiring device of claim 4 wherein said insulation is in the form of an insulating sheath integral with said electrode mount and outer cover.

6. The wiring device of claim 5 wherein the axially compressive force between parts of said insulating housing is principally between sections of said insulating sheath.

7. The device of claim 1 wherein all exposed metal parts are grounded.

References Cited

UNITED STATES PATENTS

| | | | |
|---|---|---|---|
| 1,891,153 | 12/1932 | Gates | 339—14 |
| 2,682,646 | 6/1954 | Hubbell | 339—14 |
| 2,869,102 | 1/1959 | Hubbell | 339—14 XR |
| 3,046,512 | 7/1962 | Remke et al. | 339—14 |
| 3,362,006 | 1/1968 | Fuller | 339—14 |

RICHARD E. MOORE, Primary Examiner

PATRICK A. CLIFFORD, Assistant Examiner

U.S. Cl. X.R.

339—103